United States Patent
Kawabuchi et al.

(10) Patent No.: US 7,830,542 B2
(45) Date of Patent: Nov. 9, 2010

(54) PRINTING DATA CREATION PROGRAM AND PRINTING DATA PROCESSING APPARATUS

(75) Inventors: Yoichi Kawabuchi, Itami (JP); Masakazu Murakami, Itami (JP); Hiroaki Ikeda, Itami (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1028 days.

(21) Appl. No.: 10/368,437

(22) Filed: Feb. 20, 2003

(65) Prior Publication Data

US 2003/0164981 A1 Sep. 4, 2003

(30) Foreign Application Priority Data

Feb. 20, 2002 (JP) ............................. 2002-042993

(51) Int. Cl.
*G06F 15/00* (2006.01)
(52) U.S. Cl. .................... 358/1.18; 358/1.15; 358/1.17; 715/205; 715/208; 715/209; 715/234
(58) Field of Classification Search ................. 358/1.18, 358/1.15, 1.17; 715/205, 208, 209, 234
See application file for complete search history.

(56) References Cited

U.S. PATENT DOCUMENTS

| | | | |
|---|---|---|---|
| 5,890,173 A * | 3/1999 | Yoda | 715/501.1 |
| 6,185,588 B1 * | 2/2001 | Olson-Williams et al. | 715/236 |
| 6,819,339 B1 * | 11/2004 | Dowling | 715/738 |
| 6,940,491 B2 * | 9/2005 | Incertis Carro | 345/173 |
| 7,017,108 B1 * | 3/2006 | Wan | 715/501.1 |
| 7,085,801 B1 * | 8/2006 | Abdelhadi et al. | 709/201 |
| 7,275,206 B1 * | 9/2007 | Bates et al. | 715/205 |
| 2002/0010720 A1 * | 1/2002 | Long et al. | 707/527 |
| 2003/0123079 A1 * | 7/2003 | Yamaguchi et al. | 358/1.15 |
| 2004/0205639 A1 * | 10/2004 | Drane et al. | 715/527 |

FOREIGN PATENT DOCUMENTS

| | | |
|---|---|---|
| JP | 6-342426 | 12/1994 |
| JP | 9-185607 | 7/1997 |
| JP | 9-325957 | 12/1997 |
| JP | 11-134276 | 5/1999 |
| JP | 11-203381 | 7/1999 |
| JP | 2000-330908 | 11/2000 |

* cited by examiner

*Primary Examiner*—Edward L Coles
*Assistant Examiner*—Mark R Milia
(74) *Attorney, Agent, or Firm*—Buchanan Ingersoll & Rooney PC

(57) ABSTRACT

The printing data processing system searches for reference indication (i.e., link sources) in the received ML source data, and adds the page information for the linked objects to the ML source data. The page number on which the linked object is printed is printed after the printing of each link source term included when a ML source file, such as a home page. Consequently, when a home page is printed, for example, the user can easily arrive at the linked object from the link source in the printed document while the home page layout on the personal computer is kept intact.

21 Claims, 8 Drawing Sheets

Fig. 3

Example of HTML

```
<html>
<head>
<title>sample</title>
</head>

<body>

<h1><a name="_top"></a>1. Summary of XXX</h1>

<p class=MsoNormal> XXX uses<a href="#_4. YYY is">YYY</a>enables<a
href="#_5. Restrictions regarding ZZZ">ZZZ</a></p>

<h1>2. Configuration of XXX</h1>
    . . . . . . . . . . . . . . .
    . . . . . . . . . . . . . . .

<h1>3. Full function of XXX</h1>
    . . . . . . . . . . . . . . .
    . . . . . . . . . . . . . . .

<h1><a name="_4. YYY is"></a>4. YYY is</h1>
    . . . . . . . . . . . . . . .
    . . . . . . . . . . . . . . .

<h1><a name="_5. Restrictions regarding ZZZ"></a>5. Restrictions regarding
ZZZ</h1>
    . . . . . . . . . . . . . . .
    . . . . . . . . . . . . . . .

</body>

</html>
```

Fig. 4

1. Summary of XXX
   XXX uses YYY and enables ZZZ.
2. Configuration of XXX
   . . . . . . . . . . . .
3. Full function of XXX
   . . . . . . . . . . . .
   . . . . . . . . . . . .
   . . . . . . . . . . . .
   . . . . . . . . . . . .

4. YYY is
   . . . . . . . . . . . .
   . . . . . . . . . . . .

5. Restrictions regarding ZZZ
   . . . . . . . . . . . .
   . . . . . . . . . . . .

1. Summary of XXX
 XXX uses YYY (see P. 2) and enables ZZZ (see P. 2).
2. Configuration of XXX
 . . . . . . . . . . . .
3. Full function of XXX
 . . . . . . . . . . . .
 . . . . . . . . . . .
 . . . . . . . . . . .
 . . . . . . . . . .

4. YYY is
 . . . . . . . . . . .
 . . . . . . . . . . .

5. Restrictions regarding ZZZ
 . . . . . . . . . . . .
 . . . . . . . . . . . .

1. Summary of XXX
XXX uses YYY and enables ZZZ.
2. Configuration of XXX
. . . . . . . . . . . .
3. Full function of XXX
. . . . . . . . . . . .
. . . . . . . . . . . .
. . . . . . . . . . . .

-- Reference page ----------------
YYY -------------------- P. 2
XXX -------------------- P. 2

4. YYY is
. . . . . . . . . . . .
. . . . . . . . . . . .

5. Restrictions regarding ZZZ
. . . . . . . . . . . .
. . . . . . . . . . . .

-- Reference page ----------------

— 2 —

PRINTING DATA CREATION PROGRAM AND PRINTING DATA PROCESSING APPARATUS

CROSS-REFERENCE TO RELATED APPLICATIONS

This application is based on application No. 2002-42993 filed in Japan, the contents of which are hereby incorporated by reference.

BACKGROUND OF THE INVENTION

1. Field of the Invention

The present invention relates to a printing data creation program, and more particularly to a printing data creation program that can create printing data that includes page information regarding a linked object. It also relates to a printing data processing apparatus that includes this printing data creation program.

2. Description of the Related Art

A technology that displays or prints a file comprising a home page written using a markup language (ML) such as HTML (Hypertext Markup Language) or XML (Extensible Markup Language) is known in the conventional art.

Where a home page created using a markup language is printed, the problem exists that the link information shown on the personal computer is not reflected on the printed document. In particular, where a long home page is printed for reading, while link information is displayed using underlining of terms, because the user cannot immediately know the pages on which the linked objects are shown, it may take time and effort on the part of the user to search for the pages containing the linked objects.

OBJECT AND SUMMARY

The present invention was created in order to resolve the problem identified above, and an object thereof is to provide a printing data creation program by which the user can easily learn the page on which the linked object is printed.

According to one aspect of the present invention, the printing data creation program causes the computer to perform a paper size input step in which the paper size onto which printing will be performed is input, a page layout step in which the page end position is identified and page layout processing is conducted based on the input paper size and the input ML source data, a linked object page information creation step in which page information regarding the linked object is created based on the page layout result obtained in the page layout step and the input ML source data, and a creation step in which data that can be printed is created from the page information for the linked object and the input ML source data.

A second aspect of the present invention is a printing data processing apparatus that performs printing based on printing data, and includes a paper size input unit that inputs the size of the paper on which printing will be performed, a page layout processing unit that identifies the page end position and conducts page layout based on the input paper size and the input ML source data, a linked object page information creating unit that creates page information regarding the linked object based on the page layout result obtained by the page layout processing unit and the input ML source data, and a printing data creating unit that creates data that can be subjected to printing from the page information for the linked object and the input ML source data.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 3 is a drawing showing a specific example of input ML source data;

FIG. 4 is a drawing showing the result when the ML source data shown in FIG. 3 is printed using the conventional method;

FIG. 5 is a drawing showing the results of the printing continuing from FIG. 4;

FIG. 6 is a drawing showing the result of the printing of the ML source data shown in FIG. 3 in connection with the first embodiment;

FIG. 7 is a drawing showing the result of the printing continuing from FIG. 6;

FIG. 9 is a drawing showing the result of the printing of the ML source data in connection with a second embodiment;

FIG. 10 is a drawing showing the result of the printing continuing from FIG. 9.

In the following description, like parts are designated by like reference numbers throughout the several drawings.

DESCRIPTION OF THE PREFERRED EMBODIMENTS

Preferred embodiments of the present invention are described below with reference to the drawings.

[First Embodiment]

Figure 1:
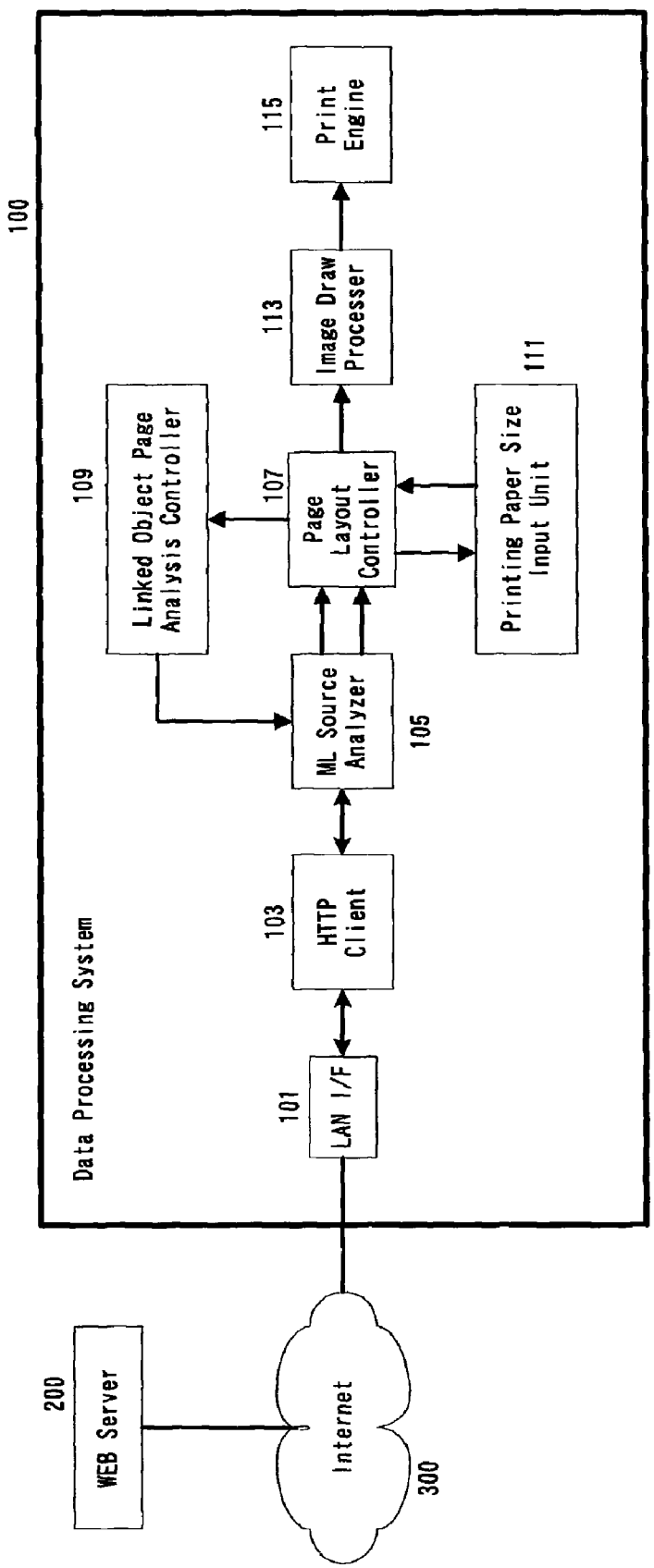
FIG. 1 is a function block diagram of a printing data processing system pertaining to a first embodiment.

FIG. 1 is a function block diagram of a printing data processing system 100 having the printing data creation program pertaining to the first embodiment of the present invention. With reference to the drawing, the printing data processing system 100 is connected to an external Web server 200 over the Internet 300, and can download data such as home pages written using a markup language.

The printing data processing system 100 includes a LAN interface (I/F) 101, an HTTP client 103, an ML source analyzer 105, a page layout controller 107, a linked object page analysis controller 109, a printing paper size input unit 111, an image draw processor 113, and a print engine 115.

The ML source analyzer 105 analyzes the ML source data received from the Web server 200, creates ML source analysis data, and sends the data to the page layout controller 107. The page layout controller 107 obtains the printing paper size from the printing paper size input unit 111.

The page layout controller 107 creates ML source data in which page end commands are inserted where necessary while carrying out page layout processing based on the obtained paper size, and sends such ML source data to the linked object page analysis controller 109. The linked object page analysis controller 109 searches for reference indication (i.e., link sources) in the received ML source data, and adds the page information for the linked objects to the ML source data. This is deemed ML source data with added page information, and is sent to the ML source analyzer 105 by the linked object page analysis controller 109.

The ML source analyzer 105 analyzes the ML source data received again, and sends ML source analysis data to the page layout controller 107.

The page layout controller 107 performs page layout processing based on the paper size once more, and unless there are changes in the positions at which page end commands are inserted, supplies image draw commands to the image draw processor 113 on a page by page basis. Where there are changes in the positions at which page end commands are inserted, the routine from the creation of ML source data in which page end commands are inserted by the page layout controller 107 through the checking for changes by the page layout controller 107 at the positions at which page end commands are inserted are repeated until there are no more changes in the positions of insertion.

The image draw processor 113 sends a print job mode command and image draw data for each page to the print engine 115.

In this embodiment, the page number on which the linked object is printed is printed after the printing of each link source term included in a ML source file, such as a home page. Consequently, when a home page is printed, for example, the user can easily arrive at the linked object from the link source in the printed document while the home page layout on the personal computer is kept intact.

Figure 2:
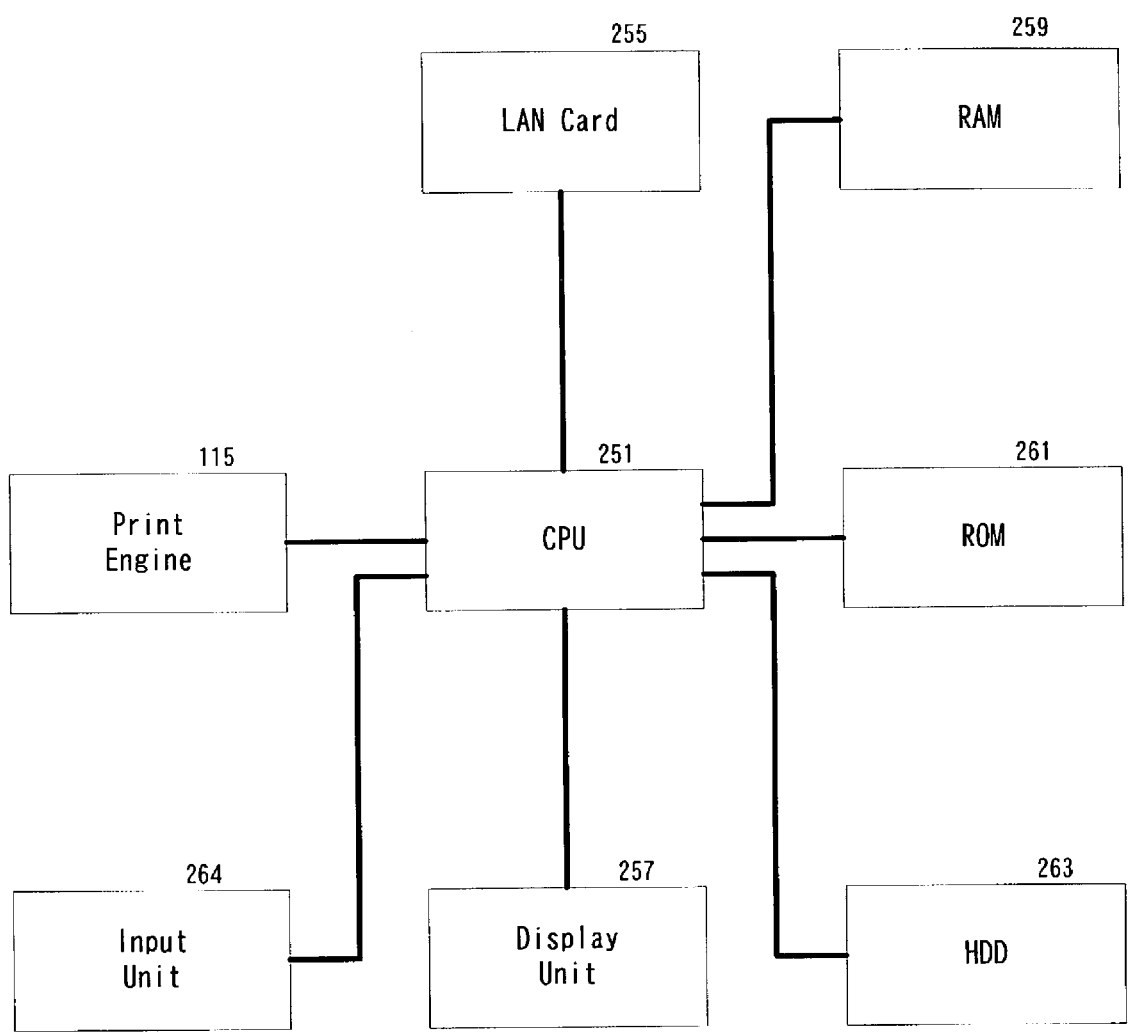
FIG. 2 is a block diagram showing the hardware construction of the printing data processing system.

FIG. 2 is a block diagram showing the hardware construction of the printing data processing system 100 shown in FIG. 1. With reference to the drawing, the printing data processing system includes a CPU 251 that performs overall control of the system, a LAN card 255 that enables connection to the Internet 300 over a LAN, a RAM 259 that temporarily stores variables and other data, a ROM 261 that stores programs and constants, a print engine 115, an input unit 264 comprising a keyboard and a mouse or the like, a display unit 257 comprising a display or other device, and a hard disk drive 263, which is a high-capacity storage device. The program used to execute the various functions of the printing data processing system 100 shown in FIG. 1 is stored in the ROM 261 in this embodiment, but it may be stored on the hard disk drive 263 instead. Alternatively, the system may also include a CD-ROM, and the program may be provided in the form of a recording medium such as a CD-ROM.

FIG. 3 is a drawing showing a specific example of ML (HTML in this embodiment) source data that is input to the ML source analyzer 105. With reference to the drawing, '_4. YYY is' is specified as the linked object for 'YYY' shown on the seventh line, and '_5. Restrictions regarding ZZZ' is specified as the linked object for 'ZZZ' in the eighth line.

FIGS. 4 and 5 are drawings showing the result of printing of the ML source data shown in FIG. 3 using the normal (i.e., conventional) method.

In the sentence '1. Summary of XXX. XXX uses YYY and enables ZZZ' shown in FIG. 4 (the first printed page), 'YYY' and 'ZZZ' are underlined. The user can see that these underlines represent the existence of linked objects, but cannot immediately see where they are printed.

FIGS. 6 and 7 are the results of printing of the ML source data shown in FIG. 3 in connection with this embodiment. With reference to the drawings, the link source terms (i.e., 'YYY' and 'ZZZ') are underlined, and the pages on which the linked objects are shown, which is the second page for both terms in this embodiment, are shown behind the terms. In other words, by seeing the indications '(see P. 2)' in FIG. 6, the user can easily see where the linked objects are shown.

For the purpose of simplifying the description, an example in which the linked objects are shown on the second page is used in this embodiment, but the present invention is even more effective where the linked object is shown on the tenth page, twentieth page, etc. in a multi-page printed document.

Figure 8:
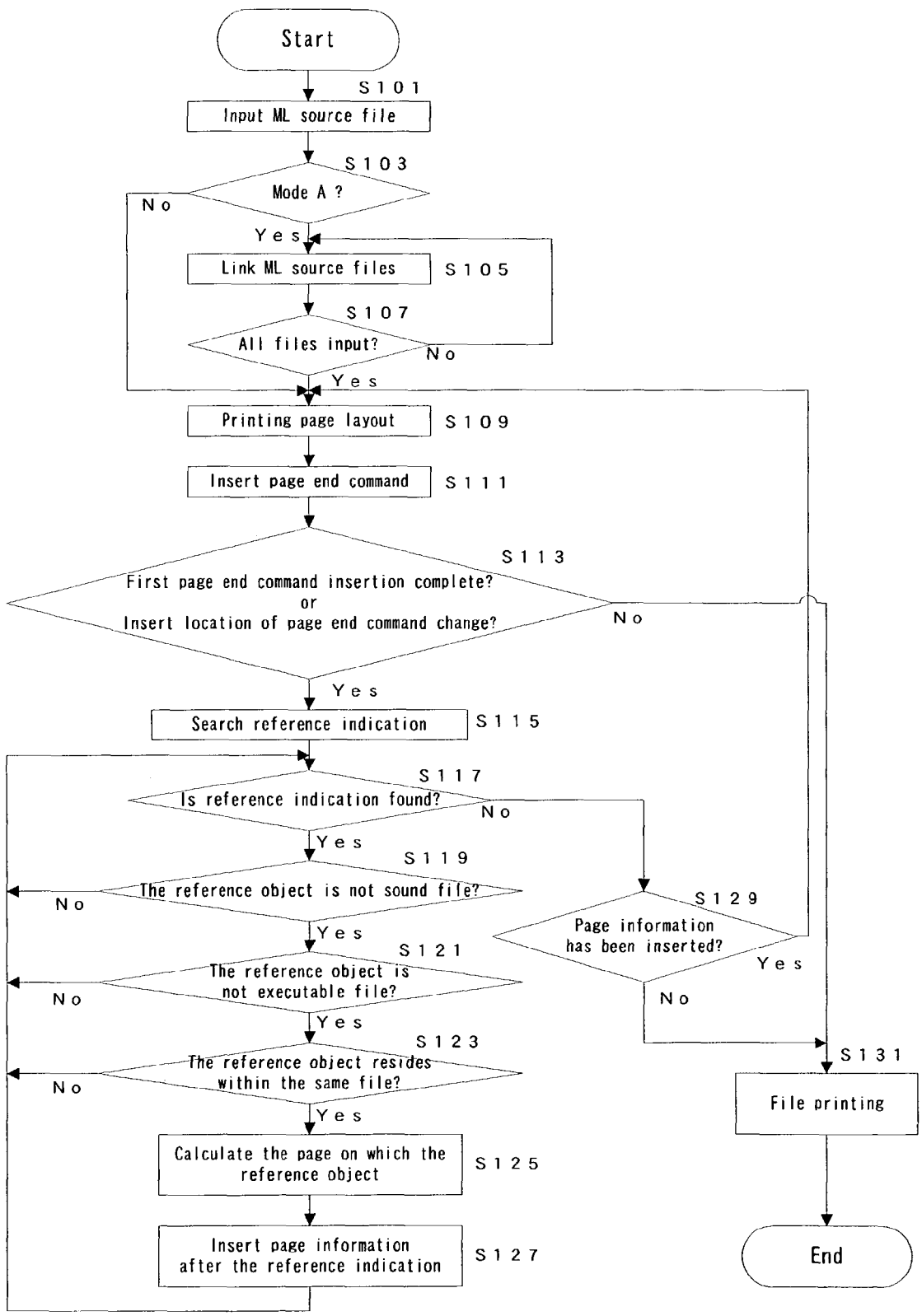
FIG. 8 is a flow chart showing the routine performed by the printing data processing system pertaining to the first embodiment.

FIG. 8 is a flow chart showing the routine performed by the printing data processing system 100, i.e., a flow chart showing the routine executed by the printing data creation program.

With reference to the drawing, in step S101, the ML source analyzer 105 inputs ML source files via the Internet 300, LAN interface 101 and HTTP client 103.

It is determined in step S103 whether the present mode is the mode A for handling multiple ML source files in the same print job, and if the determination is positive, the ML source files input in step S105 are linked to a single ML source file that was input. It is determined in step S107 whether all files have been input, and the operations of step S105 onward are repeated until the determination in step S107 is positive.

The operations of step S103-S107 are performed during a mode that prints out multiple ML files as a single output product.

When the result of the determination in step S107 is positive, or if the determination in step S103 is negative, the ML source files are laid out in order to print them within the printing area for the paper size input in step S109.

If a page end becomes necessary depending on the paper size, a page end command is inserted at an appropriate location in the ML source file in step S111.

It is determined in step S113 whether the first page end command insertion was completed or whether there is a change of insert location between the previous page end command insertion and the current page end command insertion. Where the result of either of these determinations is positive, the CPU searches in step S115 for a reference indication (i.e., a link source) in the section of the ML source data for which a page end command has been inserted. If the reference indication is found in step S117, it is determined in step S119 whether the reference object (i.e., the linked object) is not included in a sound file. If it is not, it is determined in step S121 whether the reference object is not included in a file executed by a CGI program or other type of program. If it is not, it is determined in step S123 whether the reference object resides within the same file.

If the result of the determination in step S123 is positive, the page on which the reference object is located is calculated in step S125 from the page end command. By inserting the calculated page information immediately after the reference indication in the ML source file in step S127, a file such as that shown in FIG. 6 is created. A search for the next reference indication is thereafter carried out in step S117.

If any of the results of the determinations in steps S119-S123 is negative, the CPU returns to step S117, because if the reference object is in a sound file or a file to be executed by a CGI program or other type of program, or if it resides in a different file, the page for the reference object cannot be indicated.

Where it is determined in step S117 that there are no more reference indications, it is determined in step S129 whether page information has been inserted in the current operation. Where page information has been inserted, because the page ends are deemed to have become misaligned, the operations from step S109 are carried out once more.

On the other hand, if no page information has been inserted in the current routine, the file is printed in step S131.

If the result of the determination in step S113 is negative, the file is printed in step S131 in order to indicate that the page end command insertion was not the first one and that there has been no change in the page end position.

According to this embodiment, when printing an ML source file such as a home page, the user can easily arrive at the page on which the linked object is shown from the link source in a printed document while the layout shown on the personal computer is kept intact in the manner described above.

The printing data processing system 100 may comprise a personal computer and printer, or a multi-function type image forming apparatus or so-called MFP (multi-function peripheral) having the functions of copying and printing of data received from external devices.

[Second Embodiment]

Because the hardware construction of the printing data processing system of the second embodiment is identical to that described in connection with the first embodiment, it will not be described once more.

FIGS. 9 and 10 are drawings showing the result of printing in connection with the second embodiment of the present invention regarding the ML source data shown in FIG. 3.

With reference to the drawing, the link source terms (i.e., 'YYY' and 'ZZZ') are underlined, indicating the existence of linked objects. In addition, the pages on which the linked objects are shown (the second page for both indications in this embodiment) are shown in a specific area of the page (i.e., the note area at the bottom part of the page, which is also shown as 'reference page'). The user can see the locations at which the linked objects are shown by referring to the 'reference page' area shown in FIG. 9.

Figure 11:
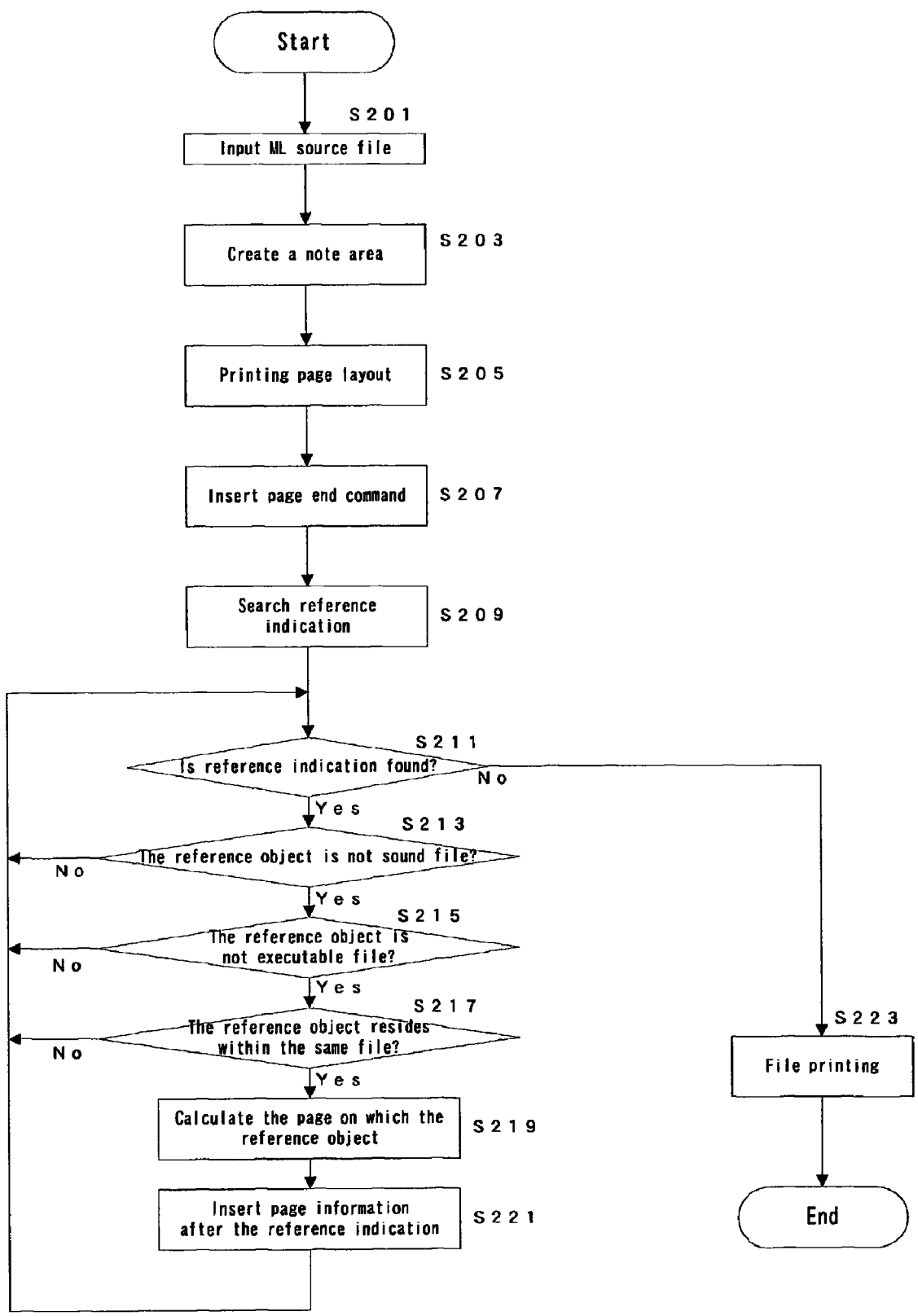
FIG. 11 is a flow chart showing the routine performed by the printing data processing system pertaining to the second embodiment.

FIG. 11 is a flow chart showing the routine executed by the printing data processing system 100, i.e., a flow chart executed by the printing data creation program.

With reference to the drawing, the printing data processing system 100 inputs ML source files in step S201. In step S203, a note area (i.e., the 'reference page' area shown in FIGS. 9 and 10) is created in the printing area based on the printing paper size that was input. The page layout controller 107 creates a layout for the ML source data in step S205 such that the ML source file can be printed outside the note area within the printing area of each page. Where a page end is necessary, a page end command is inserted at an appropriate place in the ML source data in step S207. In step S209, a reference indication (i.e., a linked source) is sought within the section of the ML source data as to which a page end command has been inserted.

It is determined in step S211 whether a reference indication has been found, and if the determination is positive, it is determined in steps S213-S217 whether the reference object is not included in a sound file or a file to be executed by a CGI program or other type of program, and whether the reference object resides within the same file as in the case of the first embodiment. If all determination results are positive, the page on which the reference object is shown is calculated in step S219 from the page end command. The link source term and the calculated page information are inserted in the note area of the ML source file in step S221, and the CPU returns to step S211.

If no reference indications are found in step S211, the document is printed in step S223.

In this embodiment, by creating note areas in the printing data and indicating the linked object information in the note areas in this way, the user can easily arrive at the linked object from the link source on a printed document while the home page layout is kept intact.

A program that causes the computer to execute either of the routines shown in the above flow charts can be provided. Such a program can also be provided on a computer-readable recording medium.

As described above, link sources are sought in data that is written using a markup language and comprises printing data, and the page information regarding the page on which each linked object is printed is inserted behind each link source term. As a result, the user can easily see the locations at which the linked objects are printed.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A non-transitory computer-readable medium encoded with a program that causes a computer to execute the following steps to print ML source data:
    a paper size input step in which the size of paper onto which printing will be performed is input;
    a first page layout step in which the end of each page of a document is calculated and a first page layout processing of said document is conducted based on the input paper size and input ML source data;
    a linked object page information creation step in which a page of said document containing a linked object is calculated, based on the first page layout result obtained in the first page layout step and the input ML source data, the linked object representing a location address from which the input ML source data is obtainable;
    a data insertion step in which data that references the calculated page is created from the page information for the linked object and the input ML source data, and inserted into said document;
    a second page layout step in which the end of each page of said document is re-calculated to determine whether the reference data inserted into said document causes a different page layout from the first page layout result obtained in the first page layout step, and a second page layout processing of said document is conducted based on the input paper size, the reference data inserted for each linked object of the input ML source data, and the re-calculated end of each page of said document;
    a linked object update determination step in which each page of said document that is calculated to contain at least one linked object in the linked object page information creation step is re-calculated to determine whether the at least one linked object is contained on a different page of said document than the page calculated in the linked object page information creation step, based on the re-calculated end of each said page of said document in the second page layout step;
    a reference data insertion update step in which the reference data inserted in the data insertion step for the at least one linked object which is determined to be contained on a different page in the linked object update determination step is updated to reference the different page on which the at least one linked object is re-calculated to be contained; and
    a printing step in which the document with said inserted reference data is printed in accordance with the second page layout result obtained in the second page layout step and the reference data which is updated for the at least one linked object in the reference data insertion update step.

2. A non-transitory computer-readable medium as claimed in claim 1,
wherein the data insertion step inserts the reference data regarding the linked object immediately following the link source term in said document.

3. A non-transitory computer-readable medium as claimed in claim 1,
wherein the data insertion step inserts the reference data regarding the linked object in a specified area of the page containing the link source.

4. A non-transitory computer-readable medium as claimed in claim 1, wherein the linked object page information creation step inhibits insertion of reference data for the linked object unless the linked object resides in the same file.

5. A non-transitory computer-readable medium as claimed in claim 1,
wherein the linked object page information creation step inhibits insertion of reference data for the linked object if the linked object comprises a sound file or a file executed by a CGI program or other executable type file.

6. A non-transitory computer-readable medium as claimed in claim 1,
wherein said data insertion step creates a new ML source file in order to insert page information for the linked object in the input ML source data.

7. A non-transitory computer-readable medium as claimed in claim 1, wherein the program causes the computer to execute:
a linked object update determination step in which each page of said document that is calculated to contain at least one linked object in the linked object page information creation step is re-calculated to determine whether the at least one linked object is contained on a different page of said document than the page calculated in the linked object page information creation step, based on the re-calculated end of each page of said document in the second page layout step; and
a reference data update step in which the reference data inserted for the at least one linked object which is determined to be contained on the different page in the linked object update determination step is updated to reference the different page on which the at least one linked object is re-calculated to be contained.

8. A non-transitory computer-readable medium as claimed in claim 7, wherein, in the printing step, the program causes the computer to print the document in accordance with the reference data which was updated for the at least one linked object in the reference data update step.

9. A printing data processing apparatus that performs printing based on printing data, comprising:
a paper size input unit that inputs the size of the paper on which printing will be performed;
a first page layout processing unit that calculates the end of each page of a document and conducts a first page layout processing of said document based on the input paper size and input ML source data;
a linked object page information creating unit that identifies a page of said document containing a linked object based on the first page layout result obtained by the first page layout processing unit and the input ML source data, the linked object representing a location address from which the input ML source data is obtainable; and a reference data insertion unit configured to insert data that references the page of said document on which each linked object is respectively identified to be contained into said document;
a second page layout processing unit configured to re-calculate the end of each page of said document to determine whether the reference data inserted into said document causes a different page layout from the first page layout result obtained by the first page layout processing unit, and to conduct a second page layout processing of said document based on the input paper size, the reference data inserted for each linked object of the input ML source data, and the re-calculated end of each page of said document;
a linked object update determination unit configured to re-identity each page of said document that is calculated to contain at least one linked object by the linked object page information creating unit, to determine whether the at least one linked object is contained on a different page of said document than the page identified by said linked object page information creating unit, based on the re-calculated end of each said page of said document by said second page layout processing unit;
a reference data insertion update unit configured to update the reference data inserted by said reference data insertion unit for the at least one linked object which is identified to be contained on a different page by said linked object update determination unit, to identify the different page on which the at least one linked object is re-identified to be contained; and
a printing unit configured to print the document with said inserted reference data is printed in accordance with the second page layout result obtained by the second page layout processing unit and the reference data which is updated for the at least one linked object by the reference data insertion update unit.

10. A printing data processing apparatus as claimed in claim 9,
wherein said printing data processing apparatus includes a personal computer and a printer.

11. A printing data processing apparatus as claimed in claim 9,
wherein said printing data processing apparatus includes an image forming apparatus having functions of copying and printing of data received from an external device.

12. A printing data processing apparatus as claimed in claim 9,
wherein the printing data creating unit inserts the reference data for the linked object immediately following the link source term in said document.

13. A printing data processing apparatus as claimed in claim 9,
wherein the printing data creating unit inserts the reference data for the linked object in a specified area of the page containing the link source.

14. A printing data processing apparatus as claimed in claim 9,
wherein the linked object page information creating unit inhibits insertion of the reference data for the linked object unless the linked object resides in the same file.

15. A printing data processing apparatus as claimed in claim 9,
wherein the linked object page information creating unit inhibits insertion of the reference data for the linked object if the linked object comprises a sound file or a file executed by a CGI program or other executable type file.

16. A printing data processing apparatus as claimed in claim 9,
wherein the printing data creating unit creates a new ML source file in order to insert page information for the linked object in the input ML source data.

17. A printing data processing apparatus as claimed in claim 9, further comprising:
a printing unit that prints the document with the inserted reference data in accordance with the second page layout result obtained by the page layout processing unit.

18. A printing data processing apparatus as claimed in claim 9, wherein the linked object page information creating unit is configured to:
re-identify each page of said document that was identified to contain at least one linked object to determine whether the at least one linked object is contained on a different page of said document than the page identified in accordance with the first page layout result, based on the re-calculated end of each page of said document in the second page layout result obtained by the page layout processing unit; and
update the reference data inserted for the at least one linked object which is determined to be contained on the different page to reference the different page on which the at least one linked object is re-identified to be contained.

19. A printing data processing apparatus as claimed in claim 18, wherein the printing data creating unit is configured to print said document to include the updated reference data for the at least one linked object.

20. A printing data creation method comprising the steps of:
inputting a paper size and ML source data;
calculating, in a printing data processing apparatus, the end of each page of a document and conducting a first page layout processing for said document based on the input paper size and the input ML source data;
creating, in the printing data processing apparatus, page information that references a page of said document containing a linked object based on the first page layout result obtained from the page layout processing and the input ML source data, the linked object representing a location address from which the input ML source data is obtainable;
inserting said reference page information for the linked object in said document;
re-calculating, in the printing data processing apparatus, the end of each page of said document to determine whether the reference page information inserted into said document causes a different page layout from the first page layout result obtained from the first page layout processing, and conducting a second page layout processing based on the input paper size, the reference page information inserted for each linked object of the input ML source, and the re-calculated end of each page of said document;
re-calculating, in the printing data processing apparatus, each page of said document that was calculated to contain at least one reference page information to determine whether the at least one reference page information is contained on a different page of said document than the page identified in the creating step, based on the re-calculated end of each page of said document in the second page layout result obtained in the second page layout processing step; and
updating, in the printing data processing apparatus, the reference page information inserted for the at least one linked object which is determined to be contained on the different page to reference the different page on which the at least one linked object is re-calculated to be contained.

21. A printing data creation method as claimed in claim 20, further comprising:
a printing step in which the document is printed with said inserted reference page information for each linked object which is contained on the same page as the page identified in the creating step, and the updated reference data for the at least one linked object which was calculated to be contained on a different page than the page identified in the creating step.

* * * * *